Patented Apr. 15, 1947

UNITED STATES PATENT OFFICE 2,419,008

PROCESS FOR POLYMERIZING VINYL FLUORIDE

Donald D. Coffman and Thomas A. Ford, Wilmington, Del., assignors to E. I. du Pont de Nemours & Company, Wilmington, Del., a corporation of Delaware No Drawing. Application November 19, 1943, Serial No. 510,964

7 Claims. (Cl. 260—88)

This invention relates to a process for preparing polymeric materials, and more particularly to a process for the polymerization of vinyl fluoride.

This application is a continuation-in-part of application Serial No. 510,966 filed of even date herewith.

As was pointed out in the above mentioned application, directed to the production of new orientable polyvinyl fluoride, vinyl fluoride has been known for a long time, and has been set apart from the vinyl halides by the fact that it is very difficult to polymerize (see United States Patent 2,068,424 and British Patent 465,520), in contrast to vinyl chloride, vinyl bromide, and vinyl iodide which polymerize with ease under a variety of conditions. The processes disclosed in the art as being generally applicable for the polymerization of vinyl halides are not suitable for the polymerization of vinyl fluoride, giving in most cases no polymer at all. In other processes described in the literature, where polyvinyl fluoride is obtained, the yields are low and the polymers are of poor quality.

This invention has as an object an improved process which is valuable for obtaining vinyl fluoride polymers generally in good yield, and which, in its preferred embodiment, is capable of producing the orientable polyvinyl fluoride described in the above identified copending application. Other objects will appear hereinafter.

The above objects are accomplished by a process which comprises polymerizing vinyl fluoride under a pressure of at least 100 atmospheres and at an elevated temperature in the presence of water and in the presence of a small proportion of a vinyl polymerization catalyst.

The polymerization reaction is carried out in a vessel capable of withstanding an internal pressure in excess of 100 atmospheres. Ordinary pressure equipment is not suitable, since the pressures of several hundred pounds per square inch which are ordinarily considered high are not within the range required for the practice of this invention. In the best method of carrying out the invention a system capable of withstanding pressures of 1000 atmospheres or greater is used to permit operation with greater safety and over a wider range of temperatures. The reaction is exothermic and the temperature should therefore be controlled to prevent a too rapid rise in temperature and pressure which may become so fast that thermal degradation of the vinyl fluoride or damage to the equipment results. For this reason it is desirable to equip the reaction system with devices for recording and controlling the internal temperature and pressure, and to provide a means of agitation. A stirring device may be employed, such as a motor-driven stirrer operating through a stuffing box, or more conveniently a shaking or rocking motion is imparted to the reactor itself.

The proportion of water employed ranges from 0.1 to 10 times, and preferably from 0.2 to 5 times, the weight of the vinyl fluoride monomer in the reactor at any one time. The presence of water in the reaction disclosed herein is of particular advantage since, when liquids other than water are used as the polymerization medium under the same conditions of pressure, temperature, catalyst, etc. the polyvinyl fluoride obtained is of lower molecular weight than when prepared with water. The higher molecular weight polymers possess several important advantages because of the valuable properties of the films and utility of the orientable polymers in fiber manufacture.

The polymerization is attended by a drop in pressure, and the pressure can be maintained constant or within a desired range by continuously or intermittently injecting additional quantities of the compressed monomer or of the water into the reactor. The course of the reaction may be followed by observing the quantity of material injected to keep the pressure constant, or by injecting intermittently and noting the rate at which the pressure falls between injections.

The catalyst used in the practice of this invention can be any of the class of compounds known to chemists as polymerization catalysts for vinyl polymerization. Organic peroxides, e. g. benzoyl peroxide or diethyl peroxide, are the preferred catalysts, and concentrations of 0.05% to 0.5%, based on the weight of vinyl fluoride employed, are generally sufficient. Amounts from 0.005% to 5%, and most desirably from 0.05% to 2%, of benzoyl peroxide (based on the total weight of the monomer) or of its molecular equivalent of another vinyl polymerization catalyst can be used. Other catalysts of this kind which are more particularly referred to hereinafter include amine oxides, hydrazine compounds, organometallic compounds, etc. The catalysts can be injected during the reaction along with the water or the vinyl fluoride, or the reaction can be run as a batch process, in which case it is convenient simply to add the catalyst to the reaction vessel before closing. In the latter case the reaction will slow down as the catalyst becomes exhausted, and when the pressure no longer falls at a measurable rate the reaction is considered to be complete.

Pressure and temperature are interdependent variables, and the ranges chosen will depend not only upon the limitations of the apparatus employed but on the reaction rate and polymer properties desired. The manner in which these variables depend upon one another will be illustrated in the examples and discussed more fully hereinafter. Temperatures of 50°–170° C. and pressures in the range 100–1000 atmospheres are principally satisfactory, the higher temperatures being best used in combination with the higher pressures.

The polyvinyl fluoride is usually obtained from the reactor in the form of a powder or a porous cake, and it may be washed with water or an organic solvent and dried in vacuum.

Vinyl fluoride monomer can be prepared in several ways, a convenient process being that described in United States Patent 2,118,901. Oxygen and acetylene are undesirable impurities and should be reduced to a practical minimum by careful distillation or scrubbing with suitable agents. It is preferable that neither oxygen nor acetylene be present to an extent of more than 0.1% by weight in the vinyl fluoride. It is likewise desirable to remove oxygen from the apparatus prior to the operation by evacuation or sweeping with an inert gas such as nitrogen. The water should also be pure and essentially free of oxygen. Distilled water which has been boiled and stored under an atmosphere of oxygen-free nitrogen is satisfactory.

The invention is further illustrated by the following examples in which parts are by weight.

Example I

A cylindrical reactor fabricated of stainless steel and designed to withstand a pressure in excess of 1000 atmospheres is flushed with pure oxygen-free nitrogen and charged with 25 parts of deoxygenated water and 0.1 part of benzoyl peroxide. The water occupies approximately one-fourth of the total internal volume of the reactor. The reactor is then closed by a head bearing an inlet valve and a thermocouple well, using an aluminum gasket at the point of closure. The nitrogen is removed by evacuating to constant pressure, and 40 parts of acetylene-free vinyl fluoride is admitted through the valve. The reactor is then placed in a reciprocating mechanism designed to produce vigorous agitation of the contents and heated to maintain an internal temperature of 80° C. corresponding to an initial internal pressure of approximately 120 atmospheres. After 12.75 hours the reactor is cooled, pressure is released, and the product, consisting of 2.4 parts of polyvinyl fluoride in the form of a white fluffy powder is washed with water and dried in vacuum. It softens slightly at 100° C. and melts at approximately 170° C. and can be formed into clear, brittle films by hot pressing. The polymer is insoluble in acetone and only partially soluble in xylene and carbon tetrachloride, but is completely soluble in hot cyclohexanone. By casting a 10% solution of the polymer in cyclohexanone on a smooth plate at 135° C., a continuous film is obtained which is clear but brittle.

By carrying out the reaction at a higher pressure, a form of polyvinyl fluoride which is tough and orientable is obtained. This is conveniently achieved by the injection of vinyl fluoride monomer or water, as illustrated in the following examples.

Example II

A cylindrical reactor fabricated of stainless steel and designed to withstand a pressure in excess of 1000 atmospheres is flushed with pure oxygen-free nitrogen and charged with 25 parts of deoxygenated water and 0.1 part of benzoyl peroxide. The water occupies approximately one-fourth of the total internal volume of the reactor. The reactor is then closed by a head bearing an inlet valve and a thermocouple well, using an aluminum gasket at the point of closure. The nitrogen is removed from the reactor by evacuating to constant pressure, and the reactor is then placed in a reciprocating mechanism designed to produce vigorous agitation of the contents. The reactor is provided with external heating and cooling devices which may be operated both manually and by an automatic temperature recording and controlling instrument which is connected with a thermocouple inserted in the thermocouple well. The inlet valve is opened to a flexible high pressure line which is connected to a pressure gauge and a safety rupture disc designed to blow out at a pressure slightly above 1000 atmospheres. This system is connected through a valve to a storage vessel containing vinyl fluoride under a pressure of about 1000 atmospheres, and it is carefully flushed with vinyl fluoride from the storage before opening the inlet valve to the reactor. Acetylene-free vinyl fluoride containing about 500 P. P. M. of oxygen is employed, and the pressure in the storage vessel is maintained by injecting pure water at the bottom, while the vinyl fluoride is withdrawn as needed from the top.

Vinyl fluoride is admitted to the reaction system from the high pressure storage to provide a pressure of about 50 atmospheres at room temperature, and heating and agitation are begun. When the internal temperature reaches 80° C., the pressure in the reactor is raised stepwise to 900 atmospheres by injection of the requisite further quantity of vinyl fluoride. The reaction gathers velocity, as evidenced by an increasingly rapid drop in pressure, and it may be necessary to cool the reaction vessel to prevent a rise in temperature. The temperature is maintained at 80° C. and additional vinyl fluoride is injected as often as required to maintain the pressure within the range of 800–960 atmospheres. The sum of the individual pressure drops occurring during the periods between repressuring operations in the next five hours is about 335 atmospheres. During an additional 1.5 hours at 80° C. and 940 atmospheres there is no further drop in pressure, showing that the catalyst is exhausted. The reaction vessel is then cooled to room temperature, the unreacted vinyl fluoride monomer is bled off, and the contents of the reactor are discharged. Eleven parts of polyvinyl fluoride is obtained in the form of a white cake which is washed with water and dried under reduced pressure at 100° C.

When heated on a copper block, the polyvinyl fluoride does not noticeably soften until a temperature of about 200° C. is reached. Pressing between aluminum foils at 200° C. and 10,000–15,000 lbs./sq. in. pressure for 1–5 minutes is sufficient to mold the polymer into a clear, tough film. Such a film sticks to a copper block slightly when heated under a pressure of about 0.1 kg./sq. cm. at 175° C., but this type of softening (sticking) is slow to develop at this temperature and does not become noticeable until a temperature of 190° C. is reached. The polymer is orientable. Narrow strips of the pressed film neck down sharply and cold draw to an elongation of 300–400% when stress is applied at room temperature. The drawn sample shows the characteristic diagram of an oriented fiber when examined by X-ray diffraction methods. It retracts about 15% in boiling water, or if "set" by preliminary immersion in boiling water while under tension it shrinks only about 4%. It has a tensile strength well in excess of 14,000 lbs./sq.

in., as compared with 4500–5500 lbs./sq. in. for the undrawn material.

The polymer does not absorb water, and even in finely divided form is not hydrolyzed by prolonged boiling with water. It is insoluble in petroleum ether, isooctane, xylene, mineral oil, chloroform, carbon tetrachloride, glacial acetic acid, acetone, ethanol, and methanol. It is soluble in hot cyclohexanone, dimethyl formamide, tetramethylene sulfone, or nitro-paraffins, and clear tough films may be obtained from these solutions by casting onto a hot smooth surface.

The solution viscosities of polyvinyl fluoride samples are conveniently compared using hot cyclohexanone as the solvent. In order to make valid comparisons between samples it is necessary to adopt a definite heating schedule for dissolving the polymer and measuring the efflux time of the sample through the capillary pipette, since cyclohexanone itself undergoes a gradual change in viscosity at elevated temperatures. The polymer is dissolved by stirring at the reflux temperature for 75 minutes and the relative viscosity is measured in a bath at 144° C. after 75 minutes. The intrinsic viscosity of the orientable polyvinyl fluoride prepared in accordance with this example is 1.56 as determined using a solution of 0.0624 g./100 ml. of cyclohexanone. The intrinsic viscosity, $$[\eta] = \frac{\log_e \eta \text{ rel.}}{C}$$

when $\eta$ rel. is the relative viscosity and C is the concentration of polymer in grams per 100 ml. of solvent.

*Example III*

The polymerization of acetylene-free vinyl fluoride containing about 500 P. P. M. oxygen is carried out as described in Example I except that the temperature used is 55° C., the pressure being maintained in the range 850–955 atmospheres. The product is 5 parts of orientable polyvinyl fluoride which is generally similar in physical properties to the product of Example I. The intrinsic viscosity is 1.73 (0.25 g./100 ml. cyclohexanone dissolved by stirring at reflux temperature for 75 minutes and measured in bath at 144° C. after 75 minutes).

Examples IV, V, and VI show the manner in which temperature and pressure are adjusted to obtain orientable polyvinyl fluoride having a desired viscosity from vinyl fluoride monomer containing no acetylene and less than 20 P. P. M. of oxygen. They also illustrate the injection of water rather than monomer to maintain the reaction pressure within the desired range.

*Example IV*

A silver-lined high pressure reactor is swept with oxygen-free nitrogen and charged with 200 parts of deoxygenated distilled water and 0.2 part of benzoyl peroxide, the liquid charge occupying approximately one-half of the total internal volume of the reactor. The reactor is closed, the nitrogen is removed by evacuation to constant pressure, and 100 parts of vinyl fluoride containing no acetylene and less than 20 P. P. M. of oxygen is admitted through the valve, cooling the reactor if necessary. The reactor is then placed in a reciprocating agitator, fitted with temperature recording and controlling devices, and connected through flexible steel high pressure tubing to a pressure gauge, rupture disc assembly, and a valve through which pure deoxygenated water may be admitted from a storage reservoir maintained at approximately 1000 atmospheres pressure. Agitating and heating are begun. When the internal temperature reaches 80° C. (after about 0.5 hour) the pressure within the reactor is quickly raised from about 150 atmospheres to 500 atmospheres by the injection of water. Thereafter the temperature is maintained within a range of 80°–83° C. and water is injected as often as necessary to maintain the pressure within the range 400–500 atmospheres. The reaction velocity, as followed by the drop in pressure during the periods between repressuring, increases during the first hour (pressure drop 100 atmospheres), reaches a maximum during the second hour (pressure drop 320 atmospheres), and then gradually diminishes, becoming negligible after about 10 hours. The individual pressure drops during the ten hours total 890 atmospheres. The reactor is cooled, the unreacted vinyl fluoride is bled off, and the polyvinyl fluoride is removed, washed with water, and dried. This vinyl fluoride polymer, 61 parts, is orientable, and in its physical properties it is generally similar to the product of Example I except that its viscosity is somewhat higher. The intrinsic viscosity, determined in cyclohexanone solution as described in Example II is 2.10. The polymer does not flow as easily as that of Example I under pressure at 200° C., and as a result is less readily molded.

It is seen by comparison with Example II that the yield and certain of the properties of orientable polyvinyl fluoride obtained at a given temperature and pressure can be considerably influenced by small traces of impurities. In this case, reducing the oxygen in the monomer from about 500 to less than 20 P. P. M. resulted in an increased yield of a product having higher viscosity. Other factors, such as the size and shape of the reactor, catalyst concentration, liquid medium or solvent used, etc., can also cause minor variations in the viscosity of the polymer. However, with a given reaction system and monomer sample, it is possible to obtain polyvinyl fluoride of a desired viscosity by adjustment of the temperature, pressure, or both.

*Example V*

The use of a higher reaction temperature results in a lower yield of a polyvinyl fluoride having lower viscosity.

The reaction is carried out as in Example IV with the modification that the reaction temperature employed is 100° C. Heating the reactor to reach an internal temperature of 100° C. requires about 0.75 hour, and the reaction is essentially complete within two hours at the reaction temperature, as indicated by the cessation of pressure drop. The total of the individual pressure drops is about 300 atmospheres. The polyvinyl fluoride, 31 parts, is orientable, and has an intrinsic viscosity, determined as in Example II, of 1.73. It flows under pressure at 200° C., and can be compression molded at this temperature to obtain tough objects or pressed into films which are easily cold drawn.

*Example VI*

The use of a lower pressure with other reaction variables unchanged results in a decreased yield of a polyvinyl fluoride having lower viscosity.

The reaction is carried out as in Example IV with the one modification that the pressure range maintained is 160–200 atmospheres at 80° C. The pressure drop is slow, and it is necessary to repressure only once during the 16 hours required for completion of the reaction. The total pressure drop is 70 atmospheres, and the product is 17 parts of orientable polyvinyl fluoride which has an intrinsic viscosity, determined as in Example II, of 1.29. The polymer flows readily under pressure at 200° C. when subjected to compression molding.

*Example VII*

The following example illustrates the use of a constant pressure throughout the reaction maintained by injection of vinyl fluoride monomer.

A silver-lined reactor is swept with oxygen-free nitrogen and charged with 200 parts of deoxygenated water and 0.2 part of benzoyl peroxide. The reactor is then closed, nitrogen is removed by evacuation, and 100 parts of vinyl fluoride containing 20 P. P. M. of oxygen and a trace of acetylene (less than 50 P. P. M.) is admitted. The reactor is placed in a reciprocating agitator, fitted with temperature recording and controlling instruments, and connected to a vinyl fluoride-filled system comprising a pressure gauge, rupture disc assembly, and a high pressure storage vessel containing monomeric vinyl fluoride of the same quality. Heating and agitation are begun, and when the temperature within the reactor reaches 78° C. additional vinyl fluoride is injected to raise the pressure in the system to 250 atmospheres by admitting pure deoxygenated water into the bottom of the vinyl fluoride storage system. Reaction sets in and the temperature is maintained at 80° C. Water is injected as rapidly as necessary to maintain the pressure in the vinyl fluoride system at 250 atmospheres. The maximum range in pressure during the reaction is 250–260 atmospheres. The reaction is followed by the rate at which the water is injected to maintain the pressure, and after 15 hours the reaction is complete, 80% of the polymerization having occurred during the first 7 hours.

The reactor is cooled, pressure is released, and the product is discharged. It is a white cake consisting of 62 parts of polyvinyl fluoride after washing and drying. Its relative viscosity (0.25 g./100 ml. of cyclohexanone at 144° C.) is 2.775, corresponding to an intrinsic viscosity of 4.1. In spite of its high viscosity, the polyvinyl fluoride is completely soluble in hot dimethyl formamide to the extent of 10–20%, and these solutions when poured on a smooth surface and warmed to drive off the solvent give tough films, which when quenched by bringing to a temperature above the softening temperature and quickly cooling, are clear, transparent, colorless, and remarkably free from optical graininess. This high viscosity polymer is excellent not only for handling by solution techniques but for compression molding applications. However, due to its higher melt viscosity it is not as suitable for the preparation of hot pressed film as are the polyvinyl fluorides obtained in Examples II or V. Films pressed at 200° C. are not fully fused, and even at 210°–215° C./3 min./10,000 lbs.–sq. in., the film obtained, although clear, orientable, and tough, has a somewhat wrinkled surface.

*Example VIII*

A silver-lined reactor is charged with 200 parts of deoxygenated distilled water, 0.08 part of diethyl peroxide, and 100 parts of vinyl fluoride. The technique used in charging and operating the equipment is the same as that described in Example IV with the modification that the reactor is not evacuated, to avoid loss of the diethyl peroxide. During the heating period when the temperature reaches 62° C. the pressure is raised to 275 atmospheres by injection of water and heating is continued until a temperature of 127° C. is reached. Additional water is then injected and the pressure is maintained within the range 300–600 atmospheres by intermittent injection of water while the temperature is maintained within the range 127°–137° C. Reaction is 80% complete within one hour, and after 8.5 hours the reaction is shut down and the product is discharged. Fifty three parts of polyvinyl fluoride is obtained in the form of a dense, tough cake, which is not completely soluble in dimethyl formamide. It has satisfactory flow characteristics for compression molding and gives smooth, clear, tough films when pressed at 200° C./3 min./10,000 lbs./sq. in.

When the reaction is carried out using a similar charging procedure but with the modification that the temperature maintained is 168°–171° C. and the pressure is 500–600 atmospheres, the product obtained is 7.5 parts of polyvinyl fluoride which is completely soluble in dimethyl formamide, having a relative viscosity of 1.212 (0.25% in cyclohexanone at 144° C.), corresponding to an intrinsic viscosity of 0.8. Films pressed under the above conditions from this product show very good flow and cold drawing properties and are tough.

If 0.4 part of trimethylamine oxide dihydrate is employed in place of diethyl peroxide and the reaction is carried out at 170° C. and 890–900 atmospheres pressure the product is polyvinyl fluoride which can be pressed at 200° C. to give a film which is tough and capable of orientation by cold drawing. Likewise if 0.2 part of lead tetraphenyl is employed as catalyst in this reaction, tough orientable polyvinyl fluoride is obtained. Similarly using 0.3 part of hydrogen peroxide as catalyst in this reaction at 90° C. and at 250 atmosphere pressure polyvinyl fluoride is obtained.

The process of this invention is useful for the polymerization of vinyl fluoride alone or in combination with any polymerizable organic compound having at least one ethylenic double bond. Examples of additional ethylenic compounds which can be copolymerized with vinyl fluoride by this process, wherein the vinyl fluoride is present in substantial or in major amount, are monoethylenic hydrocarbons, e. g. ethylene, propylene, isobutylene, and styrene; halogen-substituted ethylenes, e. g. vinyl chloride, vinyl bromide, 1,1-dichloroethylene, 1,1-difluoroethylene, difluorochloroethylene, trifluorochloroethylene, and tetrafluoroethylene; vinyl esters, e. g. vinyl formate, vinyl acetate, vinyl benzoate, and vinyl esters of inorganic acids; vinyl ethers, e. g. vinyl ethyl ether and vinyl dioxolane; vinyl ketones, e. g. methyl vinyl ketone; N-vinyl imides, e. g. N-vinyl succinimide and N-vinyl phthalimide; acrylic and methacrylic acids and their derivatives, e. g. esters, nitriles, amides, anhydrides, and acid halides, including methyl methacrylate, allyl methacrylate, acrylonitrile, N-butyl methacrylamide, etc.; derivatives of maleic and fumaric acid, e. g. diethyl maleate and dimethyl fumrate; compounds having more than one ethylenic double bond, e. g. divinyl benzene and cyclopentadiene; and compounds containing acetylenic unsaturation in addition to the ethylenic double bond, e. g. monovinylacetylene, divinylacetylene, dimethyl vinylethynyl carbinol, etc.

The vinyl polymerization catalysts used in the present process for the polymerization of vinyl fluoride include a wide variety of solid, liquid, or gaseous compounds. Further examples of peroxy compounds comprise such diacyl compounds as dibenzoyl peroxide, benzoyl acetyl peroxide and dipropionyl peroxide; dialkyl peroxides such as dipropyl peroxide; alkyl hydrogen peroxides such as tertiary butyl hydrogen peroxide; inorganic peroxides such as hydrogen peroxide, or peroxides such as barium peroxide, magnesium peroxide, and zinc peroxide which are especially effective if used in conjunction with an anhydride of an organic acid; and salts of inorganic per-acids such as ammonium persulfate, potassium persulfate, potassium percarbonate, potassium perphosphate, and sodium perborate. Vinyl polymerization catalysts other than the peroxy compounds which are useful in the practice of this invention include oxygen, hydrazine salts, e. g. hydrazine sulfate and hydrazine sebacate; amine oxides, e. g. trimethylamine oxide; and organo-metallic compounds, e. g. lead tetraethyl, lead tetraphenyl, lithium butyl, silver acetylide, etc. Although oxygen in amounts of 100–5000 P. P. M., based on the weight of monomer, can be used as a catalyst for the interpolymerization, less than 1000 P. P. M. of oxygen are preferred as larger amounts generally have a deleterious effect on the polymerization and on the properties of the polymer.

Promoters, although not necessary, may be used in conjunction with the catalyst to increase the yield or decrease the reaction time; examples are reducing agents, e. g. sodium bisulfite, sulfur dioxide, sulfoxylates, thiosulfates, etc.; acetylenic alcohols, e. g. propargyl alcohol; and metal carbonyls, e. g. nickel carbonyl, iron carbonyl, etc.

The temperature used must be suited to the catalyst employed, the lower limit being determined by the temperature at which the catalyst becomes active, and the upper limit being determined by the temperature at which the vinyl fluoride monomer or polymers suffer an undesirable degree of thermal decomposition. In general, temperatures of 30°–250° C. are used. The organic peroxides are, for the most part, not effective as catalysts at temperatures below 30° C. Benzoyl peroxide is most effective within the range 50°–120° C. Below this temperature the polymerization proceeds too slowly for economical operation, while at temperatures above 120° C. benzoyl peroxide is wastefully consumed by side reactions such as hydrolysis. Diethyl peroxide may be used at somewhat higher temperatures, most suitably in the range 100°–200° C.

To obtain appreciable reaction it is essential that the present process be conducted at a pressure in excess of 100 atmospheres and pressures in excess of 150 atmospheres are preferred, since under the higher pressures an orientable form of polyvinyl fluoride can be obtained. This form is tougher and hence more generally useful than the ordinary unorientable polyvinyl fluoride. Pressures from 200 to 1000 atmospheres are preferred for practical operation but there is, in fact, no upper limit on the useful pressure other than the limitations of the equipment employed. To obtain the orientable products, which are most useful, the pressure should be adjusted to the temperature and other reaction variables in accordance with the principles illustrated in the examples, the use of a higher temperature requires the use of a higher pressure to obtain a product of equivalent melt or solution viscosity.

The use of water in the polymerization mixture is essential for obtaining high molecular weight polyvinyl fluoride which has important advantages in the preparation of useful films and fibers. In addition the use of water leads to the production of polymers having a high degree of homogeneity in a form which can be readily removed from the reaction vessel. Water also aids in the accurate control of temperature during the polymerization reaction.

The polymerization can be carried out at any pH ranging from strongly acid to strongly alkaline. Since the efficiency of the catalyst in some cases varies with the pH, it is sometimes advantageous to employ a buffer in the aqueous phase to maintain the pH within the optimum range for the particular catalyst employed. Soaps, alkanesulfonic acids, or their salts, sodium alkyl sulfates, quaternary ammonium salts containing a long hydrocarbon chain, alkyl betaines, long chain primary alcohols, polyvinyl alcohol, etc., may be used in aiding the dispersion, and it is possible to obtain the polyvinyl fluoride in the form of an emulsion or latex.

The apparatus may be constructed of any material capable of withstanding the pressure employed, and the polymerization chamber may be lined with any material, such as mild steel, stainless steel, silver, nickel, lead, aluminum, tantalum, platinum, palladium, beryllium, chromium, glass, porcelain, or enamel, which will not adversely affect the rate of polymerization or the quality of the product. The apparatus is preferably equipped with some means of providing agitation. The vinyl fluoride polymer can be obtained batchwise without the use of compressors, etc., by charging a cooled pressure vessel with the catalyst and a quantity of liquefied vinyl fluoride monomer sufficient to develop a pressure in excess of 100 atmospheres when the closed vessel is warmed to the polymerization temperature. For practical operation, however, it is desirable to repressure the vessel during the reaction by injecting monomer or a liquid medium, especially additional water, into the reaction vessel. The injection can be carried out intermittently, maintaining the pressure within a desired range, or continuously at the rate required to maintain a constant pressure. It is generally desirable to control the pressure within rather narrow limits, as wide fluctuations in pressure result in a relatively inhomogeneous product. The process is adaptable to continuous operation as the catalyst may be injected along with the monomer or in solution in a liquid medium, and the polymer may be separated from the unreacted monomer and withdrawn by a suitable series of traps or valves while the unreacted monomer is recycled.

Polyvinyl fluoride is useful in the form of films, foils, sheets, ribbons, bands, rods, tubing, and molded objects, and as a coating for fabrics, leather, cellulose products, etc. The orientable form of polyvinyl fluoride is especially useful for these purposes and for use in the form of fibers and filaments for sutures, ligatures, threads, yarns, strings, cordage, rope, and other fibrous products. These forms are superior substitutes for silk, wool, cotton, flax, hemp, hair, bristle, gut, and other natural fibrous materials in many applications. Polyvinyl fluoride also serves as an electrical insulating material in applications involving exposure to solvents, moisture, heat, etc., and the orientable form has the further advantage of high mechanical strength.

The polymers of vinyl fluoride may be combined with or prepared in the presence of plasticizers, modifiers, stabilizers, softeners, dyes, pigments, fillers, and natural or synthetic resins.

As many apparently widely different embodiments of this invention may be made without departing from the spirit and scope thereof, it is to be understood that we do not limit ourselves to the specific embodiments thereof except as defined in the appended claims.

We claim:

1. A process for making polyvinyl fluoride which comprises heating vinyl fluoride in contact with water in amount of from 0.1 to 10 times the weight of the vinyl fluoride and with from 0.005 to 5% by weight of the vinyl fluoride of a vinyl polymerization catalyst under a pressure in excess of 100 atmospheres at a reaction temperature within the range of 30° C. to 250° C., which activates the catalyst, and continuing the heating until a substantial amount of the vinyl fluoride is polymerized.

2. A process for making polyvinyl fluoride which comprises heating with agitation vinyl fluoride in contact with water in amount of from 0.1 to 10 times the weight of the vinyl fluoride and with from 0.005 to 5% by weight of the vinyl fluoride of a vinyl polymerization catalyst under a pressure in excess of at least 100 atmospheres at a reaction temperature within the range of 30° C. to 250° C., which activates the catalyst, and continuing the heating until a substantial amount of the vinyl fluoride is polymerized.

3. The process set forth in claim 1 in which said polymerization catalyst is an organic peroxy compound.

4. The process set forth in claim 2 in which said polymerization catalyst is an organic peroxy compound.

5. The process set forth in claim 1 in which said polymerization catalyst is a diacyl peroxide.

6. The process set forth in claim 1 in which said polymerization catalyst is a dialkyl peroxide.

7. A process for obtaining high molecular weight polyvinyl fluoride which in the form of films and filaments is capable of being cold drawn to a molecularly oriented product of increased tensile strength, said process comprising heating vinyl fluoride in contact with water in amount of from 0.1 to 10 times the weight of the vinyl fluoride and with from 0.005 to 5% by weight of the vinyl fluoride of an organic peroxy compound under a pressure in excess of 150 atmospheres to a pressure of 1000 atmospheres at a reaction temperature within the range of 50° C. to 250° C., which activates the catalyst, and continuing the heating until a substantial amount of the vinyl fluoride is polymerized.

DONALD D. COFFMAN.
THOMAS A. FORD.

REFERENCES CITED

The following references are of record in the file of this patent:

UNITED STATES PATENTS

| Number | Name | Date |
|---|---|---|
| 2,224,663 | Berg et al. | Dec. 10, 1940 |
| 2,068,424 | Mark et al. | Jan. 19, 1937 |
| 1,425,130 | Plauson | Aug. 8, 1922 |
| 2,298,039 | D'Alelio | Oct. 6, 1942 |
| 2,362,960 | Thomas | Nov. 14, 1944 |

OTHER REFERENCES

Starkweather, article in Jour. Am. Chem. Soc., vol. 56, pages 1870–1874 (1934).